United States Patent
Ellsworth et al.

(10) Patent No.: US 6,452,354 B1
(45) Date of Patent: Sep. 17, 2002

(54) CLOSED LOOP CONTROL SYSTEM FOR PRODUCING A SEALED POUCH

(75) Inventors: W. David Ellsworth, Macedon; Larry J. Powell, Penfield; David I. Laber, Victor, all of NY (US)

(73) Assignee: Hudson-Sharp Machine Co., Green Bay, WI (US)

( * ) Notice: Subject to any disclaimer, the term of this patent is extended or adjusted under 35 U.S.C. 154(b) by 0 days.

(21) Appl. No.: 09/798,786

(22) Filed: Mar. 2, 2001

(51) Int. Cl.[7] .............................................. G05B 11/06
(52) U.S. Cl. ...................... 318/566; 318/626; 318/646; 318/677
(58) Field of Search ............................ 318/566, 568.25, 318/576, 578, 626, 646, 677

(56) References Cited

U.S. PATENT DOCUMENTS

| | | | |
|---|---|---|---|
| 4,316,566 A | * | 2/1982 | Arleth et al. |
| 5,551,213 A | * | 9/1996 | Koelsch et al. |
| 5,699,653 A | * | 12/1997 | Hartman et al. |
| 5,716,425 A | * | 2/1998 | Wolfe et al. |
| 6,041,579 A | * | 3/2000 | Savoury et al. ............... 53/551 |

* cited by examiner

Primary Examiner—Bentsu Ro
(74) Attorney, Agent, or Firm—Wood, Phillips, Katz, Clark & Mortimer

(57) ABSTRACT

A system for maintaining a desired sealing force is provided, which incorporates a closed loop control system. The system includes a platen, which has a surface for making contact with one or more items to be sealed, a motor for producing a linear movement, a linkage coupled to the platen and the motor for transferring the linear movement produced by the motor to the platen, and a transducer coupled between the linkage and the platen for measuring the force applied to the platen via the linkage through the linear movement of the motor and producing a signal representative of the force measured. A motor controller produces a motor control signal, which is supplied to the motor for controlling the same. The motor control signal is used to control the linear movement produced by the motor. The motor controller further receives the feedback signal from the transducer, and correspondingly adjusts the value of the control signal used to control the magnitude of the linear movement.

18 Claims, 3 Drawing Sheets

CLOSED LOOP CONTROL SYSTEM FOR PRODUCING A SEALED POUCH

FIELD OF THE INVENTION

The present invention relate to systems for maintaining a desired sealing force in connection with producing packaging materials, and particularly to systems which incorporate a closed loop control system.

BACKGROUND OF THE INVENTION

One technique for producing packaging materials including bags and pouches has included selectively applying a heated sealing force to multiple layers of unrolled material, where the multiple layers have been selectively bonded together as a result of the applied sealing force. The heat is generally applied under a sealing pressure that causes to be bonded or sealed together select portions of the multiple layers.

One area where such a technique has been used is in the manufacturing of medical pouches. Given the nature of the medical industry and the type of items being packaged, medical pouch manufacturers typically have had more stringent requirements and guidelines than other types of industries having similar packaging processes, which need to be adhered to during the manufacturing of the pouches. Process specifics such as heat and force are examples of processing parameters that have been more tightly controlled in an attempt to ensure a consistent high quality for the pouches produced.

However, heat parameters can change over time, especially throughout a particular job run. Generally, both the heat and the sealing force are applied through a platen. In many instances, at initial start-up, the platen will be hot, but will have an insufficient amount of stored heat energy to handle the fresh, cool material being initially supplied. As the job continues over the course of the run, a heat equilibrium is established. The ambient conditions in and around the machine reach a more stable level and new operating parameters apply. However even after an equilibrium is established, the equilibrium can be subsequently affected, for example by interruptions during the manufacturing run, which can include short stops for lunch, breaks, and/or the like, that can cause the heat characteristics to change.

Other processing parameters can also vary, and thereby effect the specific heat and force, which is applied to the material, and ultimately affect the quality of the pouch being produced. For example, the properties of the material used to form the one or more of the layers of material can vary as the material is unrolled. The properties of the material can also change as new rolls of material are loaded onto the system. The platen itself, as well as the surface against which the platen presses the material, can also add to the variability. As the heated plate seals against a sealing surface, like rubber, the rubber surface begins to wear or form an impression according to the die in use. This can have the effect of changing the sealing characteristics, and more specifically can affect the effective sealing force.

One prior approach used in an attempt to meet the requirements of the medical industry included collecting data of the principal operating parameters, like heat and temperature throughout a packaging run, often indirectly. At the end of the run, a sample from the run would be tested to insure that it met the manufacturing requirements desired, and if so, it would be assumed that the other pouches produced, similarly met the requirements, so long as the parameter measurements could be shown to have been maintained at a consistent level throughout the manufacturing run.

One such prior system incorporated a hydraulic or pneumatic control of the platen. The operator would enter the desired force by adjusting a hydraulic regulator, and the desired valve response times. A computer would then calculate the time that the valve is on, and send signals to open and close the valve. The valve would then send the hydraulic flow to the platen cylinder, and a pressure transducer connected to the fluid pressure in the cylinder would send a voltage output consistent with the fluid pressure measurement to a data collection device. The data would then be reviewed to identify any inconsistencies.

However because of the potential for the operating environment to change, as noted above, the pressure reading from the pressure transducer in the hydraulic cylinder does not always directly correlate to the actual sealing pressure applied to the layers of material. Nor does a consistent reading from the pressure transducer insure that a consistent pressure was applied to the layers of material. Furthermore, in such a system, the data was not fed back or used to adjust the operating characteristics of the system during the run. The data was often only used to chart system performance and attempt to determine consistency after the fact.

Consequently, it would be desirable to more directly measure the desired processing parameters, such as sealing force, and to be able to suitably adjust the operating characteristics during a manufacturing run, in order to maintain the parameters at the desired level.

These and other objects, features, and advantages of this invention are evident from the following description of a preferred embodiment of this invention, with reference to the accompanying drawings.

SUMMARY OF THE INVENTION

The present invention provides for a system for maintaining a desired sealing force including a closed loop control system. The system includes a platen, which has a surface for making contact with one or more items to be sealed. The system further includes a motor for producing a linear movement, a linkage coupled to the platen and the motor for transferring the linear movement produced by the motor to the platen, and a transducer coupled between the linkage and the platen for measuring the force applied to the platen via the linkage through the linear movement of the motor and producing a signal representative of the force measured. A motor controller produces a motor control signal, where the motor controller is coupled to the motor for supplying the control signal thereto. The motor control signal is used to control the linear movement produced by the motor. The motor controller further receives the feedback signal from the transducer, and correspondingly adjusts the value of the control signal used to control the magnitude of the linear movement.

In one embodiment of the present invention the transducer is incorporated as part of a pin which couples the platen to the linkage. In at least another embodiment a spring is used as part of the linkage to regulate the force applied as a measure of the linear movement created by the motor.

Other features and advantages of the present invention will be apparent from the following detailed description, the accompanying drawings, and the appended claims.

DETAILED DESCRIPTION OF THE PREFERRED EMBODIMENTS

Figure 1:
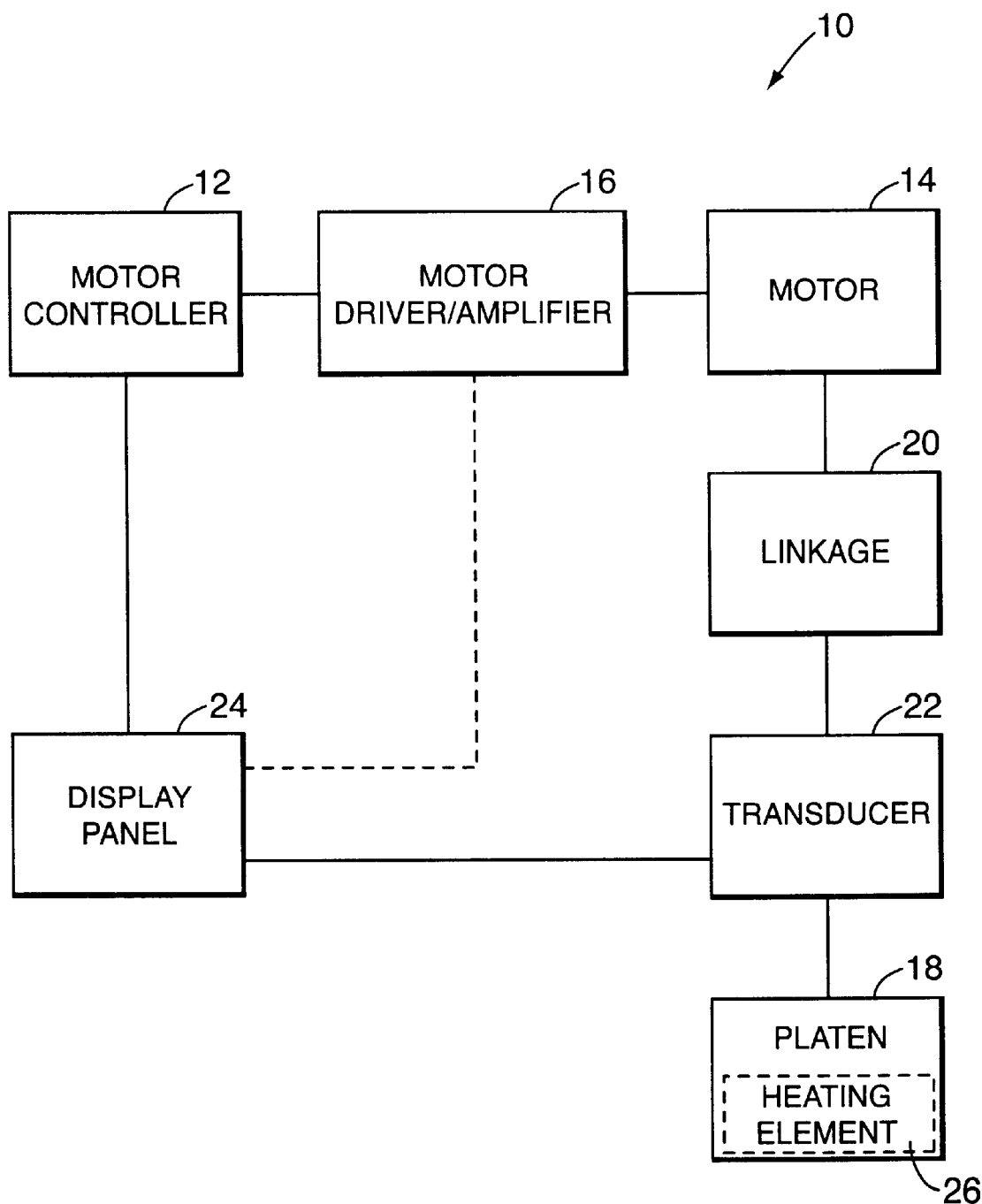
FIG. 1 is a block diagram of a system for maintaining a desired sealing force including a closed loop control system, in accordance with the present invention;.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram of a system 10 for maintaining a desired sealing force including a closed loop control system, in accordance with the present invention. The system 10 includes a motor controller 12, which produces a control signal for driving a motor 14. Prior to the motor 14 receiving the control signal from the motor controller 12, the control signal is received by a motor driver circuit/amplifier 16, which conditions the control signal for driving the specific motor 14.

The control signal is received by the motor 14, which causes the motor to produce an appropriate linear motion. The linear motion produced by the motor 14 is in turn conveyed to a platen 18, via an intermediary linkage 20. A transducer 22 is coupled between the linkage 20 and the platen 18 for measuring the force applied to the platen 18 via the linkage 20, as a result of the linear movement of the motor 14. The transducer 22 in turn produces a feedback signal representative of the force measured.

The feedback signal is received by the motor controller 12, which in turn, makes any necessary adjustments to the motor control signal for maintaining the desired sealing force. In the at least one embodiment illustrated in FIG. 1, the feedback signal is received by the motor controller 12 via a display panel 24. The display panel 24 displays a representation of the force measured by the transducer 22. The display panel 24, optionally, additionally includes a relay for disabling the forward movement of the motor 14, in the event that the force measured by the transducer 22 equals or exceeds a threshold force value. The disabling signal can be received directly by the motor 14, the motor driver/amplifier 16, or the motor controller 12. In the illustrated embodiment, the disabling signal is received by the motor driver/amplifier 16.

In at least one embodiment, including the embodiment illustrated in FIG. 1, the platen 18 includes a heating element 26. The heating element 26 enables at least selective portions of the contact surface of the platen 18 to be heated, in order to facilitate the sealing together of corresponding portions of the multiple layers of material located and/or traveling beneath the platen 18.

Figure 2:
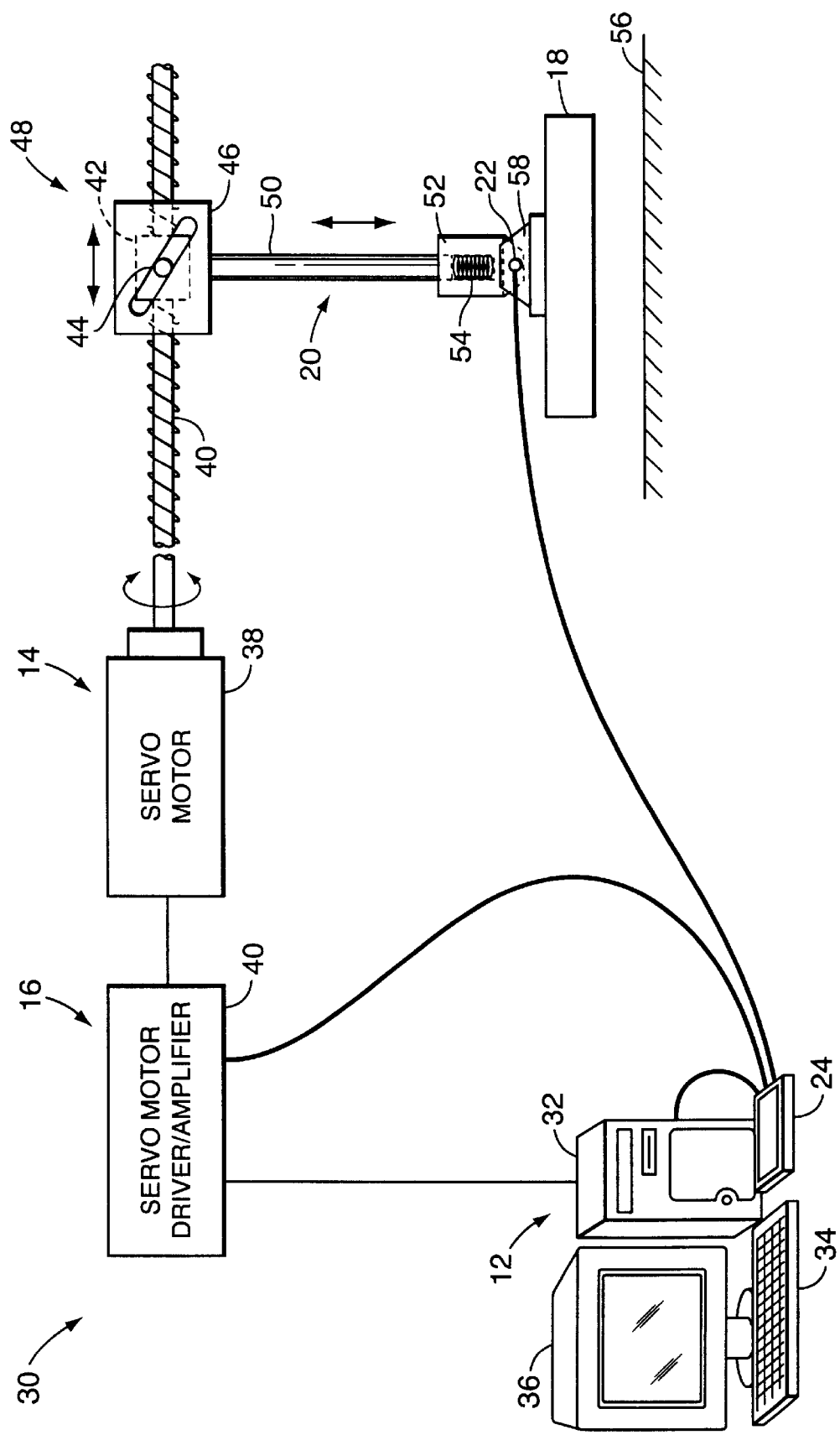
FIG. 2 is a more detailed schematic view of at least one embodiment of the system for maintaining a desired sealing force, shown in FIG. 1.

FIG. 2 illustrates a more detailed schematic view 30 of at least one embodiment of the system 10 for maintaining a desired sealing force, shown in FIG. 1. To the extent that common elements are present in both the more detailed schematic view 30, illustrated in FIG. 2, and the system 10, illustrated in FIG. 1, the same or similar number designations are used.

The more detailed schematic view 30, similarly includes a motor controller 12, which produces a motor control signal. In the detailed schematic view 30, the motor controller 12 is illustrated as including a computer 32 having a keyboard 34 and a touch sensitive screen 36, and upon which a computer program is running. The keyboard 34 enables a user to type information into the computer 32, while the touch sensitive screen 36 enables both data to be displayed to the user, as well as for information to be received, which enables the user to manually set or adjust the desired operating parameters. The computer 32 could be any suitable computer including a standard personal computer. The personal computer could be in the form of a traditional consumer type having a stand alone packaging style, as shown, or could be in a more industrial friendly form, including rack mounted type designs, as well as designs, which allow the computer to be embedded and/or incorporated into a user station of a larger piece of equipment.

Based upon the user selected operating parameters, the motor controller 12 produces a control signal, which is supplied to the motor 14 via a motor driver/amplifier 16. In the more detailed schematic view 30, the motor 14 is a servo motor 38, and the motor driver/amplifier 16 is a servo motor driver/amplifier 40. When activated the servo motor 38 rotates a ball screw 40, upon which a guide block 42 travels. The guide block 42 includes a pin 44, which travels horizontally with the guide block 42. The pin 44 travels within an angled slot formed within a plate 46. The plate 46 operates as a diagonally oriented path restrictor. The ball screw 40, guide block 42, pin 44, and plate 46 form at least part of a transmission 48, which translates the rotation of the servo motor 38 into a linear movement. In at least one embodiment, the pin 44 is a cam follower bearing, which travels within the angled slot.

Because the motion of the pin 44 is limited to being in the horizontal direction, in order for the pin 44 to travel along the diagonally defined path, the plate 46 needs to move in a vertical direction. By adjusting the slope of the diagonally defined path, the rate of vertical movement of the plate 46, in response to the horizontal movement of the pin 44 of the guide block 42, can be affected. This has the potential to create a gearing effect.

Plate 46 is coupled to a rod 50, which forms part of the linkage 20 transferring the linear motion produced by the motor 14 to the platen 18. The rod 50 has a first end and a second end. Connected to the first end of the rod 50 is a rod eye 52, which similarly has a first end and a second end. The first end of the rod eye 52 includes a bore, which extends lengthwise from the end into the rod eye 52. The bore at the first end of the rod eye 52 receives the first end of the rod 50. Between the first end of the rod 50 and the base of the bore is a spring 54, which limits the travel of the end of the rod 50 toward the base of the bore, and manages the magnitude of the force transmitted between the rod 50 and the rod eye 52. The force transmitted between the rod 50 and the rod eye 52, is proportional to the distance the spring is compressed and is further related to the corresponding spring constant of the spring 54.

Generally, the spring 54 is only compressed after the platen 18 has engaged the surface 56 against which the layers of materials to be sealed are pressed. After the platen 18 initially engages the surface 56, any additional linear travel by the rod 50 causes the spring 54 to compress, resulting in a corresponding increase in the force applied.

The rod eye 52 is coupled to the platen 18 via a clevis 58, and a transducer 22, which is in the shape of a pin and contained within a second bore. The second bore extends through the clevis 58 and the second end of the rod eye 52, cross-wise. The pin-shaped transducer 22 is located at the single point of connection between rod eye 52 and the clevis 58, such that the actual force applied by the platen 18 against the surface 56 can be measured directly at that point. The transducer 22, in turn, produces a feedback signal in the form of a voltage representative of the force applied.

In at least one embodiment, a second rod is used as part of the linkage 20 to transfer the linear force produced by the motor 14 to the platen 18. The second rod is coupled to the platen 18 via a second clevis, a second spring loaded rod eye, and a corresponding connection pin. Where two rods are used, a pin shaped transducer can be used to couple one or both of the rod eyes to the corresponding clevis. Where only one transducer is used, the non-transducer pin is of a standard type, which couples the clevis to the rod eye, without incorporating transducer capabilities. The second rod is similarly coupled to the guide block 42 via plate 46 or a similar second plate. Where multiple plates are used, they generally can be coupled together. The use of multiple rods help to provide additional stability to the platen 18.

The feedback signal is received by the motor controller 12, via a display panel 24. The motor controller 12 uses the feedback signal for adjusting the value of the control signal used to the control the magnitude of the linear movement of the motor 14. In the illustrated embodiment, the magnitude of the force applied is displayed numerically by the display panel 24, to provide instant visual verification to the user.

Structures of this type regularly apply sealing forces in the range of ten to fifteen thousand pounds. Sealing forces at least as high as eighteen thousand pounds have been observed. An upper limit of the applied sealing force can be controlled by a safety relay located in the display panel 24, which in the event that the sealing force equals or exceeds the upper limit causes the further forward motion of the servo motor 38 to be disabled.

When the feedback signal produced by the transducer 22 is received by the motor controller 12, the motor controller 12 can use the feedback signal to adjust the linear distance the motor 14 causes the linkage 20 to travel. Typically, on the first cycle of a new job, the motor controller 12 attempts to correct the magnitude of the linear movement, based upon 100% of the difference between the desired and the actual force. On subsequent cycles, the motor controller 12 will average the differences over several cycles, and provide an adjustment based upon the average. Using an average for subsequent cycles helps to prevent oscillations in the adjustments.

In addition to the feedback provided directly from the transducer 22, at least one type of servo motor driver/amplifier 16 has the capability to track the amount of current supplied to the motor 14, which is also proportional to the force applied to the platen 18, and therefore could be used as an alternative approach to track the force.

Figure 3:
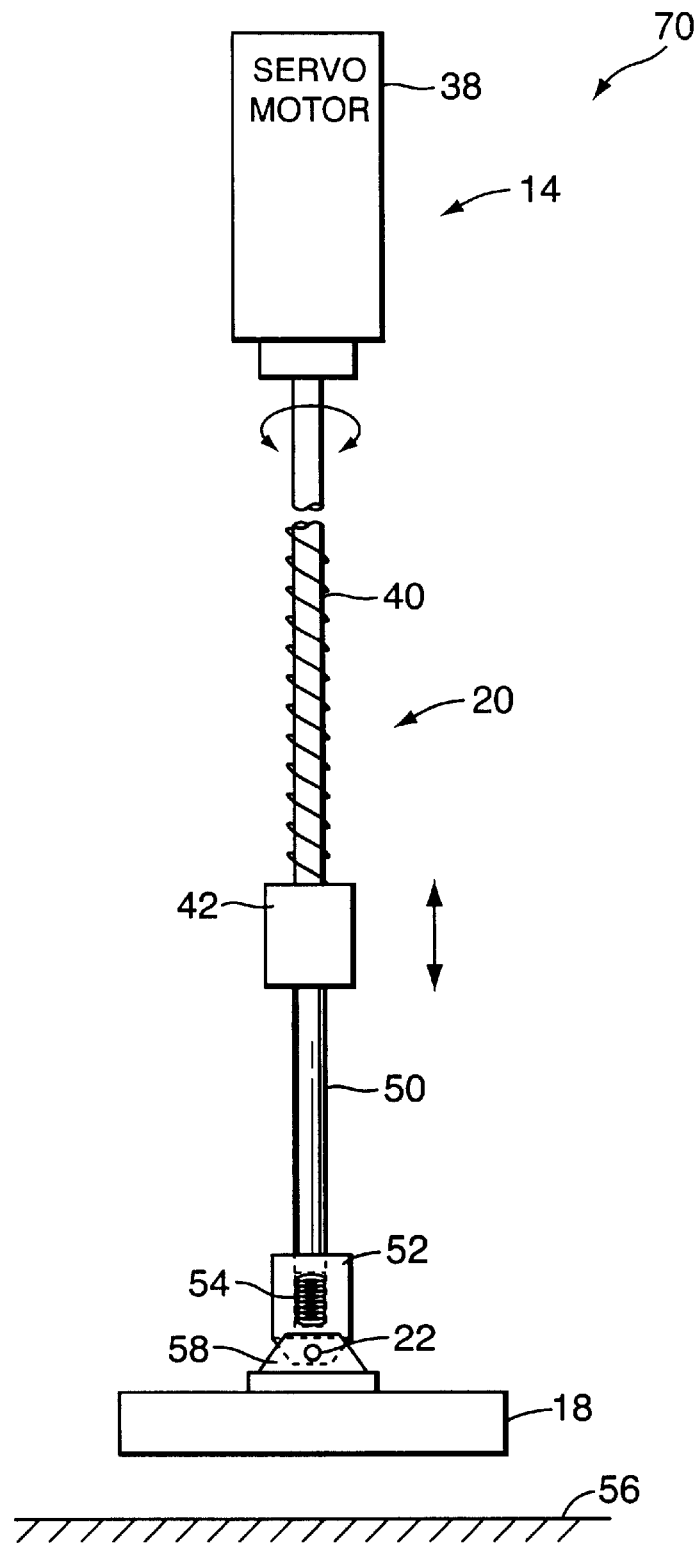
FIG. 3 is a partial more detailed schematic view illustrating the motor, the linkage and the platen of an alternative embodiment of the system for maintaining a desired sealing force, shown in FIG. 1.

FIG. 3 illustrates an alternative embodiment for producing a linear movement, in which the motor 14, the linkage 20 and the platen 18 are specifically illustrated. Instead of the servo motor 38 being oriented so as to produce a horizontal motion, which is later converted into a vertical motion, the servo motor 38 is oriented so as to directly produce a vertical motion. This enables several of the transmission elements including the pin 44, and plate 46 used to create the diagonally defined path, to be eliminated. However, in the process you also lose the gearing effect that can be created by controlling the slope of the diagonally defined path.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

What is claimed is:

1. A system for maintaining a desired sealing force including a closed loop control system comprising:
    a platen having a surface for making contact with one or more items to be sealed;
    a motor for producing a linear movement;
    a linkage coupled to the platen and the motor for transferring the linear movement produced by the motor to the platen;
    a transducer coupled between the linkage and the platen for measuring the force applied to the platen via the linkage through the linear movement of the motor and producing a feedback signal representative of the force measured; and
    a motor controller for producing a motor control signal, where the motor controller is coupled to the motor for supplying the control signal thereto, thereby controlling the linear movement produced by the motor, and receiving the feedback signal from the transducer for correspondingly adjusting the value of the control signal used to control the magnitude of the linear movement.

2. The system as claimed in claim 1 wherein the motor includes a servo motor and a transmission for translating the rotational movement of the servo motor to a linear movement.

3. The system as claimed in claim 2 wherein the transmission includes a ball screw and a guide block.

4. The system as claimed in claim 2 wherein the transmission includes a diagonally oriented path restrictor, which necessitates vertical movement in response to horizontal movement.

5. The system as claimed in claim 1 wherein the linkage includes a spring which is compressed as a result of further linear movement of the motor after the platen makes contact with the one or more items to be sealed.

6. The system as claimed in claim 5 wherein the linkage further includes a rod having a first end and a second end; and a rod eye having a first end including a bore within which the spring and the first end of the rod are received, and a second end having an eye in which a pin is received.

7. The system as claimed in claim 6 wherein the transducer is incorporated as part of a pin which is received in the eye of the rod eye and couples the platen to the linkage.

8. The system as claimed in claim 1 wherein the platen includes a clevis having a bore through which a pin is received for coupling the platen to the linkage.

9. The system as claimed in claim 1 wherein the platen includes a heating element for heating at least a portion of the contact surface.

10. The system as claimed in claim 1 further comprising an amplifier, wherein the motor controller is coupled to the motor via the amplifier.

11. The system as claimed in claim 1 wherein the motor controller includes a computer.

12. The system as claimed in claim 11 wherein the computer includes a monitor having a touch sensitive screen for displaying and receiving information.

13. The system as claimed in claim 1 wherein the motor controller includes a display panel which displays a representation of the force measured by the transducer.

14. The system as claimed in claim 13 wherein the display panel displays the representation of force as a numeric value.

15. The system as claimed in claim 13 wherein the motor produces movement in both a forward direction and a reverse direction, and wherein the display panel includes a relay for disabling the forward movement of the motor if a threshold force value is equaled or exceeded.

16. The system as claimed in claim 1 wherein the motor controller is adapted to adjust subsequent values of the control signal used to control the magnitude of the linear movement of the motor.

17. The system as claimed in claim 16 wherein the value of the control signal is adjusted by an amount corresponding to the difference between the desired force and the actual force applied as measured by the transducer.

18. The system as claimed in claim 16 wherein the value of the control signal is adjusted by an amount corresponding to the difference between the desired force and the average of the actual force for a preceding predetermined number of sealing force cycles.

* * * * *